(12) United States Patent
Druga et al.

(10) Patent No.: US 11,882,856 B2
(45) Date of Patent: Jan. 30, 2024

(54) SYSTEM AND METHOD FOR CONTINUOUS THERMAL TREATMENT OF A FLOWABLE PRODUCT

(71) Applicants: SinnovaTek, Inc., Raleigh, NC (US); North Carolina State University, Raleigh, NC (US)

(72) Inventors: Michael Druga, Raleigh, NC (US); Josip Simunovic, Raleigh, NC (US); Thomas Kenner, Raleigh, NC (US); Steven Giunta, Raleigh, NC (US)

(73) Assignees: SinnovaTek, Inc., Raleigh, NC (US); North Carolina State University, Raleigh, NC (US)

( * ) Notice: Subject to any disclaimer, the term of this patent is extended or adjusted under 35 U.S.C. 154(b) by 570 days.

(21) Appl. No.: 17/025,182

(22) Filed: Sep. 18, 2020

(65) Prior Publication Data
US 2021/0000143 A1   Jan. 7, 2021

Related U.S. Application Data

(63) Continuation of application No. PCT/US2019/025276, filed on Apr. 2, 2019.
(Continued)

(51) Int. Cl.
*H05B 6/70* (2006.01)
*H05B 6/68* (2006.01)
*A23L 3/01* (2006.01)

(52) U.S. Cl.
CPC ............... *A23L 3/01* (2013.01); *H05B 6/681* (2013.01); *H05B 6/701* (2013.01); *H05B 6/707* (2013.01)

(58) Field of Classification Search
CPC ......... A23L 3/01; B21D 22/022; B21D 22/20; B21D 22/26; B21D 5/01; B21D 5/015; B21D 5/06; B21D 53/88; B60L 2210/30; B60L 53/24; B60L 58/15; C11B 9/02; C21C 5/5217; C21C 5/5229; C21C 5/5264; C21C 5/527; C21C 5/562; C21D 1/18; C21D 1/673; C21D 9/0068; C21D 9/46;
(Continued)

(56) References Cited

U.S. PATENT DOCUMENTS 3,551,199 A * 12/1970 Forster ................... B29C 35/10
219/699
4,577,078 A    3/1986 Noda et al.
(Continued)

OTHER PUBLICATIONS

WIPO; International Preliminary Report on Patentability for International Patent Application No. PCT/US19/25276 dated Oct. 15, 2020, 12 pages.
(Continued)

*Primary Examiner* — Quang T Van
(74) *Attorney, Agent, or Firm* — NK Patent Law

(57) ABSTRACT

System and method for thermally treating a flowable product includes an apparatus including a waveguide for providing electromagnetic energy, a conduit for receiving a flowable material, and an applicator for delivering electromagnetic energy from a generator to the waveguide. The waveguide includes first and second arms that each comprise an output that is isolated from the output of the other arm by a phase shift, such that any reflected electromagnetic energy exits the arm through the input port and does not flow into the opposing arm.

24 Claims, 7 Drawing Sheets

Related U.S. Application Data

(60) Provisional application No. 62/651,778, filed on Apr. 3, 2018.

(58) Field of Classification Search
CPC ......... C22C 38/02; C22C 38/04; C22C 38/06; E04C 2003/0434; E04C 2003/0473; E04C 3/07; F02D 2250/24; F27B 14/06; F27B 14/14; F27B 2014/068; F27B 3/085; F27B 3/183; F27D 1/0033; F27D 1/0043; F27D 1/02; F27D 11/10; F27D 2003/0075; F27D 2003/164; F27D 3/0025; F27D 3/0033; F27D 3/16; G01P 3/488; H02J 7/14; H02P 2101/45; H02P 2103/20; H02P 9/48; H05B 6/681; H05B 6/701; H05B 6/707; H05B 6/802
USPC ....... 219/678, 690, 691, 693, 696, 697, 699, 219/756; 333/125, 137
See application file for complete search history.

(56) References Cited

U.S. PATENT DOCUMENTS

| 5,834,744 | A | * | 11/1998 | Risman | H05B 6/681 |
| | | | | | 219/696 |
| 8,324,539 | B2 | | 12/2012 | Hallac et al. | |
| 9,657,991 | B2 | | 5/2017 | Hallac et al. | |
| 2010/0012650 | A1 | | 1/2010 | Drozd | |
| 2016/0044750 | A1 | | 2/2016 | Wilber et al. | |

OTHER PUBLICATIONS

ISA/KR; International Search Report and Written Opinion for International Patent Application No. PCT/US2019/025276 dated Jul. 12, 2019, 15 pages.
Canadian Intellectual Property Office, Office Action from Corresponding Canadian Patent Application No. 3,094,484, dated May 30, 2023, 3 pages.

* cited by examiner

SYSTEM AND METHOD FOR CONTINUOUS THERMAL TREATMENT OF A FLOWABLE PRODUCT

CROSS-REFERENCE TO RELATED APPLICATIONS

This application is a continuation of International Patent Application No. PCT/US19/25276, filed on Apr. 2, 2019, which claims priority to U.S. Provisional Patent Application No. 62/651,778 filed on Apr. 3, 2018, the entire contents of which are all hereby incorporated herein by reference.

TECHNICAL FIELD

The present invention relates to a system and method for the continuous thermal treatment of a flowable product, such as a food product.

BACKGROUND

Prior to purchase by the consumer, packaged foods and other biomaterials are typically treated to minimize microbial growth that can otherwise occur during transport, distribution, storage and the like. Current commercially available methods of reducing microbial growth include heating the material to an appropriate temperature for a sufficient length of time to kill or otherwise inactivate any pathogenic or spoilage-causing microorganisms and/or spores. Typically, indirect heating methods are used in which the material is passed through a chamber that is typically heated to temperatures of 60-150° C. Due to contact with the heated chamber, the temperature of the material increases to substantially the same temperature as the surrounding chamber whereby the objective of reducing microbial growth is achieved. However, many foodstuffs and other biomaterials are negatively impacted by the application of heat from the chamber. For example, detrimental effects have been observed in taste, aesthetic appearance, nutrient levels, and the like. Additionally, biomaterials exposed to a heated surface can easily burn and stick to the surface, causing reduced heat flow, increased run times, and the production of off flavors, a phenomenon referred to as thermal fouling.

Opportunities exist for providing an improved system and method for thermally treating foods and other biomaterials.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is an apparatus for thermally treating a flowable material comprising: a waveguide defined by first and second arms that extend in opposing directions, wherein each arm comprises a termination end that includes a reflector plate and a port for allowing a conduit to pass therethrough; a conduit for receiving a flowable material, wherein the conduit passes through the first and second arms and wherein at least a portion of the conduit is transparent to electromagnetic energy; a multi-port applicator junction that delivers electromagnetic energy to the first and second arms of the waveguide; and a generator for providing electromagnetic energy to the multi-port applicator junction through an input port. Each waveguide arm includes an output that is isolated from the output of the other arm and optionally includes a phase shift, such that any reflected electromagnetic energy exits the arm through the input port.

According to one or more embodiments, the first and second arms of the waveguide are about the same length.

According to one or more embodiments, the first and second arms of the waveguide are of unequal lengths.

According to one or more embodiments, the electromagnetic energy is provided at a wavelength of at least approximately $1 \times 10^{-4}$ meters.

According to one or more embodiments, the phase shift is approximately 180 degrees.

According to one or more embodiments, the electromagnetic energy is provided at a frequency of approximately $3 \times 10^{12}$ waves per second or less.

According to one or more embodiments, the electromagnetic energy is microwave energy.

According to one or more embodiments, the electromagnetic energy is single mode.

According to one or more embodiments, the generator is a magnetron.

According to one or more embodiments, the multi-port applicator junction comprises the input port that receives electromagnetic energy, a first output port that delivers electromagnetic energy to the first arm, a second output port that delivers electromagnetic energy to the second arm, and an end port.

According to one or more embodiments, the input port is perpendicular to the first and second arms.

According to one or more embodiments, the 4-port applicator junction is configured to deliver electromagnetic energy entering the input port equally between the first and second arms.

According to one or more embodiments, the portion of the conduit that is transparent to electromagnetic energy is constructed from one or more ceramic materials, glass, or polymeric materials.

According to one or more embodiments, the portion of the conduit that is transparent to electromagnetic energy is approximately 50-100 percent transparent.

According to one or more embodiments, a portion of the conduit passing through the first arm has a first microwave transparency, and a portion of the conduit passing through the second arm has a second microwave transparency that is different from the first microwave transparency.

According to one or more embodiments, the apparatus further comprises one or more temperature sensors positioned within the conduit, waveguide, or both.

According to one or more embodiments, the apparatus further comprises a control device for maintaining a constant flow rate of product through the conduit.

According to one or more embodiments, the constant flow rate is at least approximately 0.1 to 1.0 gallons per minute.

According to one or more embodiments, the apparatus further comprises a controller for regulating a power level of the generator.

According to one or more embodiments, the flowable material is a biomaterial.

According to one or more embodiments, the biomaterial is a food product.

According to one or more embodiments, the flowable material is not subjected to a heated surface.

According to one or more embodiments, the apparatus is configured to control and deliver unequal electromagnetic energy density to the first and second arms of the waveguide.

According to one or more embodiments, the unequal energy distribution occurs in real time or prior to delivery.

Disclosed herein is a method of thermally treating a flowable material. The method comprises passing the flowable material as a continuous stream through a thermal treatment apparatus comprising: a waveguide defined by first and second arms that extend in opposing directions, wherein each of the first and second arms comprises a termination end that includes a reflector plate and a port for allowing a conduit to pass therethrough; a conduit for receiving a flowable material that passes through the first and second arms, wherein at least a portion of the conduit is transparent to electromagnetic energy; a multi-port applicator junction that delivers electromagnetic energy to the first and second arms of the waveguide; and a generator for providing electromagnetic energy to the multi-port applicator junction through an input port. Each waveguide arm includes an output that is isolated from the output of the other waveguide arm by a phase shift, such that any reflected electromagnetic energy exits the waveguide arm through the input port. The method further comprises initiating the generator to provide electromagnetic energy to the input port of the multi-port applicator junction, wherein the electromagnetic energy travels to the first and second arms of the waveguide, and wherein the portion of the conduit that is transparent to electromagnetic energy is thereby exposed to electromagnetic energy such that the flowable material is thermally treated.

According to one or more embodiments, the flowable material moves through the conduit at a constant flow rate.

According to one or more embodiments, the phase shift is approximately 180 degrees.

According to one or more embodiments, the electromagnetic energy is single mode.

According to one or more embodiments, the electromagnetic energy has a wavelength of at least approximately $1 \times 10^{-4}$, a frequency of approximately $3 \times 10^{12}$ waves per second or less, or both.

According to one or more embodiments, the method further comprises packaging the flowable material for refrigerated storage.

According to one or more embodiments, the electromagnetic energy provides a sufficient temperature for a sufficient time to accomplish sterilization of the flowable material, pasteurization of the flowable material, or both.

According to one or more embodiments, the electromagnetic energy is provided to the input port of the multi-port applicator junction at a wavelength of at least approximately $1 \times 10^{-4}$ meters.

According to one or more embodiments, the electromagnetic energy is provided to the input port of the multi-port applicator junction at a frequency of approximately $3 \times 10^{12}$ waves per second or less.

According to one or more embodiments, the electromagnetic energy is microwave energy.

According to one or more embodiments, the electromagnetic energy is single mode.

According to one or more embodiments, the multi-port applicator junction comprises the input port that receives electromagnetic energy, a first output port that delivers electromagnetic energy to the first arm, a second output port that delivers electromagnetic energy to the second arm, and an end port.

According to one or more embodiments, the portion of the conduit that is transparent to electromagnetic energy is constructed from one or more ceramic materials, glass, or polymeric materials.

According to one or more embodiments, the portion of the conduit that is transparent to electromagnetic energy is approximately 50-100 percent transparent.

According to one or more embodiments, a portion of the conduit passing through the first arm has a first microwave transparency, and a portion of the conduit passing through the second arm has a second microwave transparency that is different from the first microwave transparency.

According to one or more embodiments, the electromagnetic energy is delivered to the first and second arms of the waveguide in unequal amounts.

According to one or more embodiments, the unequal energy distribution occurs in real time or prior to delivery to the first and second arms.

According to one or more embodiments, the conduit, waveguide, or both comprise one or more sensors.

According to one or more embodiments, the sensors are selected from temperature sensors, pressure sensors, conductivity sensors, arc detection sensors, dielectric property sensors, or combinations thereof.

According to one or more embodiments, the thermal treatment apparatus further comprises a control device for maintaining a constant flow rate of product through the conduit.

According to one or more embodiments, the constant flow rate is at least approximately 0.1 to 1.0 gallons per minute.

According to one or more embodiments, the thermal treatment apparatus further comprises a controller for regulating a power level of the generator.

According to one or more embodiments, the flowable material is a biomaterial.

According to one or more embodiments, the biomaterial is a food product.

According to one or more embodiments, the flowable material is not subjected to a heated surface.

According to one or more embodiments, the method further comprises controlling and delivering unequal electromagnetic energy density to the two waveguide arms.

According to one or more embodiments, the conduit is substantially horizontal within the first and second arms of the waveguide.

According to one or more embodiments, the conduit has an angled disposition within the first and second arms within the first and second arms of the waveguide.

According to one or more embodiments, the flowable material travels in a direction approximately opposite to a direction of propagation of the electromagnetic energy when the flowable material is moving through one of the first and second arms, and wherein the flowable material travels in a direction approximately parallel to the direction of propagation of the electromagnetic energy when the flowable material is moving through the other of the first and second arms.

According to one or more embodiments, the flowable material is exposed to a gradually increasing power density of the electromagnetic energy when the flowable material is moving through one of the first and second arms, and wherein the flowable material is exposed to a gradually decreasing power density of the electromagnetic energy when the flowable material is moving through the other of the first and second arms.

According to one or more embodiments, an average bulk temperature of the flowable material rises in increasing increments for each sub-unit of length of one of the first and second arms when the flowable material is flowing therethrough, and wherein the average bulk temperature of the flowable material rises in decreasing increments for each sub-unit of length of the other of the first and second arms when the flowable material is flowing therethrough.

Disclosed herein is an apparatus for thermally treating a flowable material. The apparatus comprises: a waveguide defined by first and second arms that extend in opposing directions, wherein each arm comprises a termination end that includes a reflector plate and a port for allowing a conduit to pass therethrough; a conduit for receiving a flowable material, wherein the conduit passes through the first and second arms and wherein at least a portion of the conduit is transparent to electromagnetic energy; a multi-port applicator junction that delivers electromagnetic energy to the first and second arms of the waveguide; and a generator for providing electromagnetic energy to the multi-port applicator junction through an input port. Each waveguide arm includes an output that is isolated from the output of the other arm and optionally includes a phase shift, such that any reflected electromagnetic energy exits the arm through an exit port different from the input port.

According to one or more embodiments, the multi-port applicator junction comprises the input port that receives electromagnetic energy, a first output port that delivers electromagnetic energy to the first arm, a second output port that delivers electromagnetic energy to the second arm, and the exit port.

Disclosed herein is a method of thermally treating a flowable material. The method comprises passing the flowable material as a continuous stream through a thermal treatment apparatus comprising: a waveguide defined by first and second arms that extend in opposing directions, wherein each of the first and second arms comprises a termination end that includes a reflector plate and a port for allowing a conduit to pass therethrough; a conduit for receiving a flowable material that passes through the first and second arms, wherein at least a portion of the conduit is transparent to electromagnetic energy; a multi-port applicator junction that delivers electromagnetic energy to the first and second arms of the waveguide; and a generator for providing electromagnetic energy to the multi-port applicator junction through an input port. Each waveguide arm includes an output that is isolated from the output of the other waveguide arm by a phase shift, such that any reflected electromagnetic energy exits the waveguide arm through an exit port different from the input port. The method further comprises initiating the generator to provide electromagnetic energy to the input port of the multi-port applicator junction, wherein the electromagnetic energy travels to the first and second arms of the waveguide, and wherein the portion of the conduit that is transparent to electromagnetic energy is thereby exposed to electromagnetic energy such that the flowable material is thermally treated.

According to one or more embodiments, the multi-port applicator junction comprises the input port that receives electromagnetic energy, a first output port that delivers electromagnetic energy to the first arm, a second output port that delivers electromagnetic energy to the second arm, and the exit port.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

FIG. 3b is front plan view and FIG. 3c is a top plan view of the system of FIG. 3a.

DETAILED DESCRIPTION OF THE EMBODIMENTS

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention. The present invention will be further described with reference to the accompanying drawings:

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Continuous flow microwave heating is an emerging technology in the food processing arena, offering fast and efficient heating of a food product or biomaterial. The presently disclosed subject matter is generally directed to a system that can be used to treat continuously flowing fluids with electromagnetic energy sources such as, for e.g., microwave energy.

Embodiments of the instant application can advantageously provide a simpler, less expensive, spatially compressed and efficient way of delivering microwave energy to a continuously flowing material/product using less applicator construction materials and simpler method of fabrication and assembly. Embodiments of the instant invention can also enable more efficient control and minimization of undesirable effects such as localized overheating, flashing, arcing and potentially catastrophic processing conduit failures, process interruptions and losses in processing time, energy, process materials and cleaning supplies.

Figure 1:
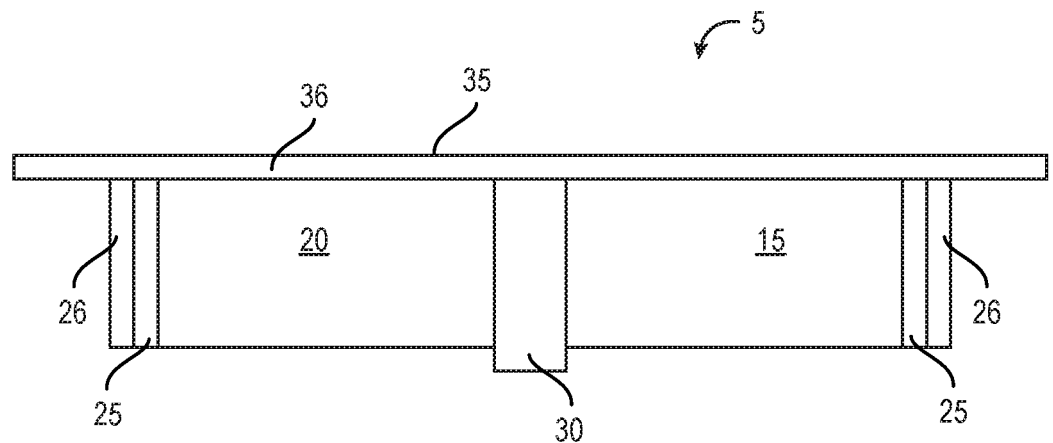
FIG. 1 is a front plan view of a thermal treatment system in accordance with some embodiments of the presently disclosed subject matter.

Referring now to the Figures, as shown in FIG. 1, system 5 comprises waveguide 10 that includes first and second arms 15, 20. The term "waveguide" as used herein refers to any device having a characteristic and purpose of at least partially confining electromagnetic energy. The termination portion of each arm includes reflective plate 25. Applicator junction 30 delivers electromagnetic energy to the first and second arms in both the current and counter-current directions. Conduit 35 housing permits flowable product 36 to travel through the waveguide, thereby exposing the flowable product to the electromagnetic energy, such as, for example, microwave energy. Microwave heating is typically considered a volumetric or non-contact heating method, where "contact" typically implies physical contact of the processed material with the means of heating. The waveguide therefore acts as an electromagnetic exposure tunnel through which product 36 to be heated is conveyed.

The term "electromagnetic energy" as used herein refers to monochromatic or polychromatic radiation or energy. In some embodiments, the electromagnetic energy can be provided at a wavelength of at least about $1\times10^{-4}$ meter. In some embodiments, the electromagnetic energy can be provided at a frequency of about $3\times10^{12}$ waves per second or less. However, the disclosed system can provide electromagnetic energy at a wavelength and frequency greater or smaller than the ranges set forth herein. The electromagnetic energy can be microwave energy in some embodiments. The term "microwave energy" refers to electromagnetic energy having a frequency of about 300 MHz and 30 GHz.

Figure 2A:
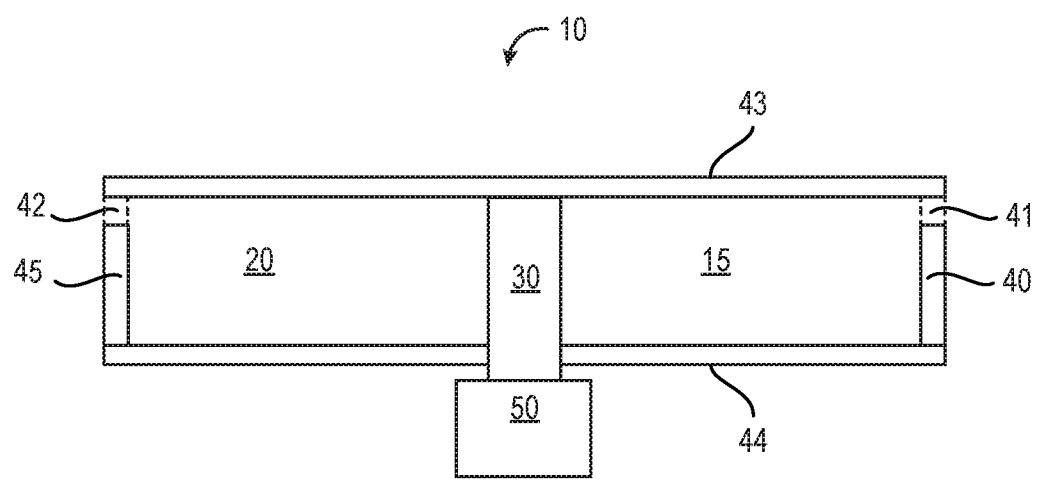
FIGS. 2a-2d are front plan views of waveguides associated with a thermal treatment system in accordance with some embodiments of the presently disclosed subject matter.

FIG. 2a illustrates one embodiment of waveguide 10 comprising co-linear first and second arms 15, 20 that extend in opposite directions from applicator junction 30. As shown, waveguide 10 extends in length from first termination end 40 comprising conduit entrance port 41 to second termination end 45 comprising conduit exit port 42. The entrance and exit ports are sized and shaped to allow conduit 35 to pass through the waveguide. The first and second termination ends 40, 45 of the waveguide comprise reflective plates 25 (FIG. 1 shows reflective plates 25). The reflective plates can improve energy absorption and distribution control by reflecting electromagnetic energy that has not been absorbed back into the product flow in the opposing direction. As a result, the need for water loads at the termination ends of the waveguide, as is typically practiced in existing methodologies, is eliminated. The reflective plates can be constructed from any electromagnetically reflective material known or used in the art such as aluminum, stainless steel, or any other electrically conductive material. Alternatively or additionally, the reflective plates can include a reflective coating positioned towards the interior of the waveguide. The reflective plates are sized and shaped to prevent leakage of electromagnetic (e.g., microwave) energy from the waveguide at the conduit entrance and exit ports.

Chokes 26 are positioned on the exterior side of each reflective plate, extending out to surround the conduit. The chokes can act to terminate electromagnetic energy at the end of the waveguide, and further prevent leakage of the electromagnetic energy into the surrounding environment. The chokes can include a hole to allow the conduit to pass through. The chokes can further include a channel extending out from the hole and surrounding the conduit. In one embodiment, each choke can have an inner diameter that is slighter greater than the conduit's outer diameter. The chokes may be of sufficient length to prevent or minimize leakage of electromagnetic energy; for example, in one embodiment, the length may be greater than one-fourth the wavelength of the electromagnetic energy wave. The chokes can be positioned on the reflective plates using any method known or used in the art.

In some embodiments, each choke can include additional protection by the provision of a complete faraday cage in locations where the conduit enters and exits the system. This can result in further decreased or eliminated energy leakage at all frequencies. In one embodiment, the faraday cage can be fastened to the conduit or to the choke, for example, through a threaded or crimped connection, with the fastener made of stainless steel for food safe applications or similar other materials as the fastener's surface can come into contact with the liquid material.

Figure 2B:
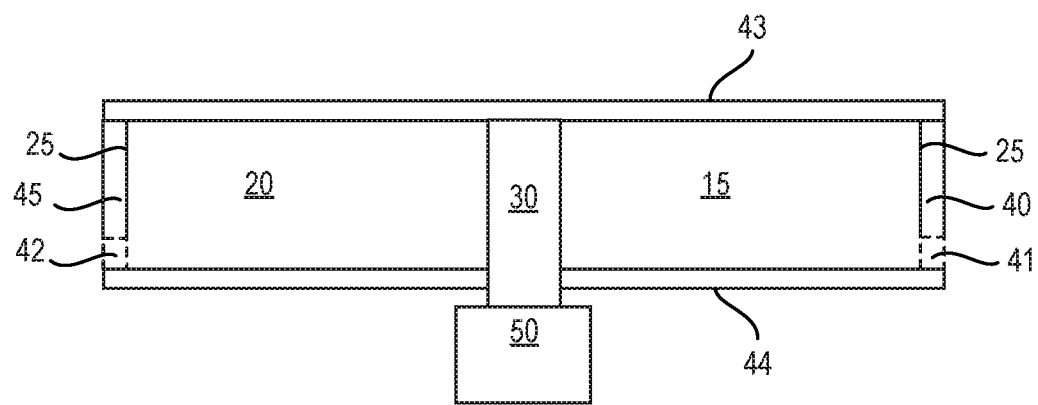
Figure 2C:
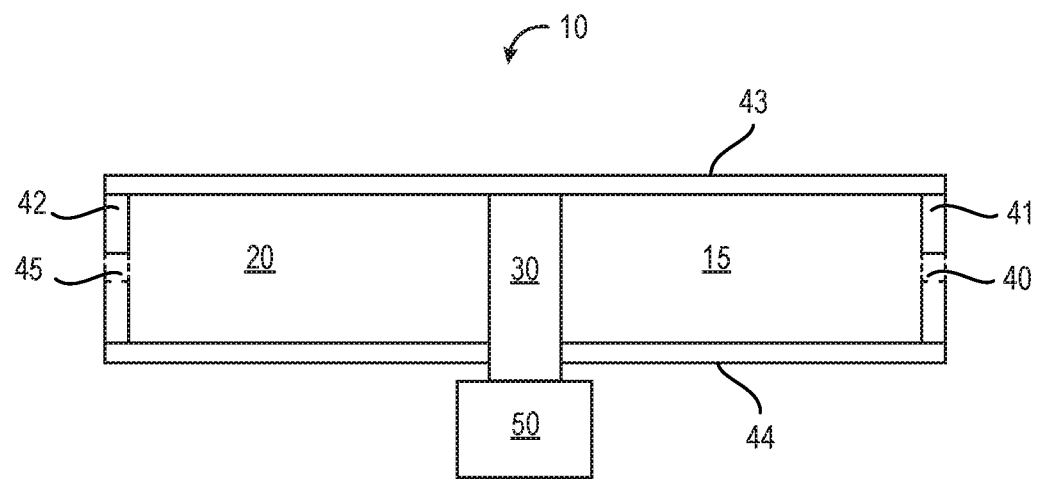
Figure 2D:
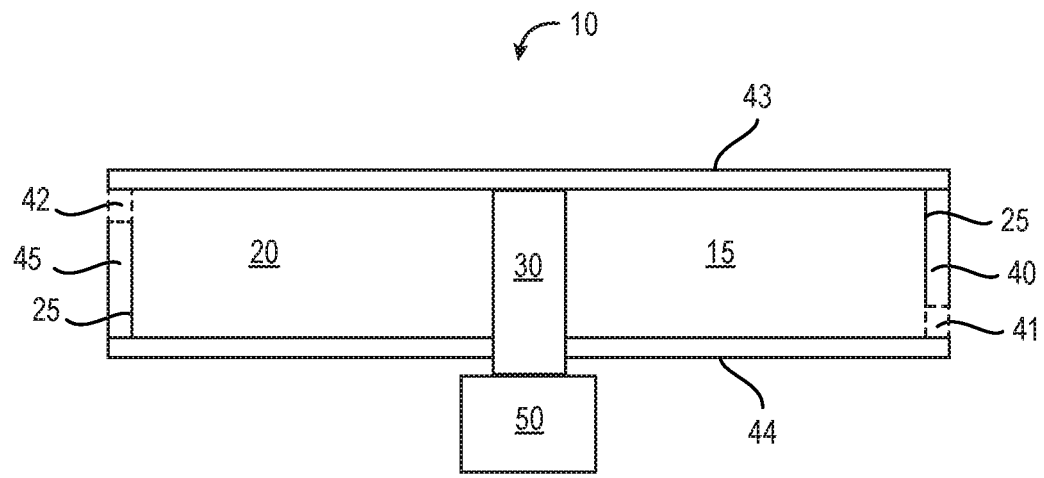

The entrance and exits ports can be configured at any location on reflective plates 25. For example, the entrance and exit ports can be configured proximal to top surface 43 of the waveguide, as shown in FIG. 2a. Alternatively, ports 41, 42 can be positioned proximal to bottom waveguide surface 44 as shown in FIG. 2b. However, it should be appreciated that the ports can be configured on any location between the top and bottom surfaces (for example, the ports may be located approximately midway between the top and bottom surfaces as shown in FIG. 2c), and/or at any location between the vertical surfaces (left or right) of the waveguide. In some embodiments, ports 41, 42 can be positioned at differing locations as shown in FIG. 2d. In this description, expressions relating to the positions of ports such as top, bottom, left and right only serve as relative to the dimensions of the waveguide itself, while in the actual embodiments, waveguides, their walls and entry and exit ports can be placed at any angle convenient or required for handling the product at hand, conveyance and/or processing. Accordingly, the configurations described herein may not necessarily be adjusted just horizontal or vertical. This includes configurations with spatially varying positions of waveguides, walls and exit ports such as with so called twisted waveguides, as well as waveguides with non-rectangular geometries such as cylindrical waveguides.

Figure 3A:
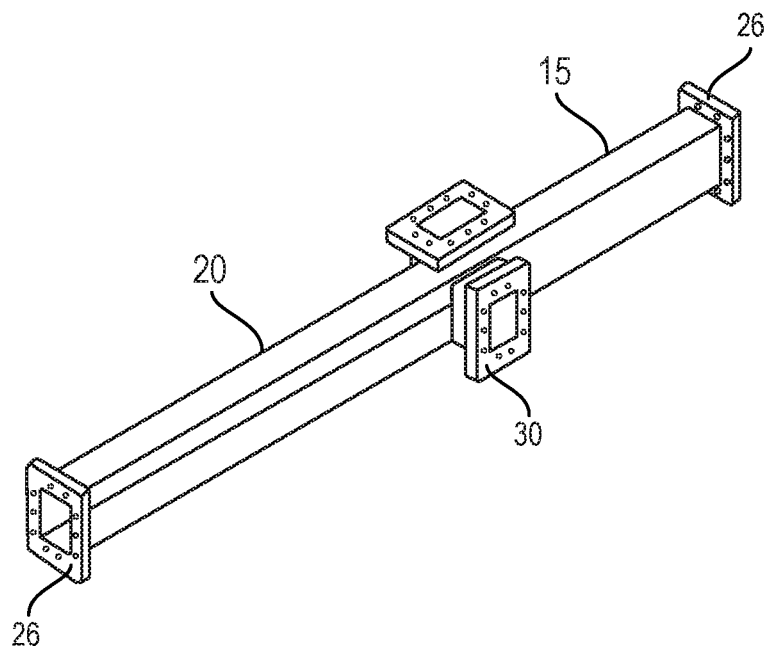
FIG. 3a is a perspective view of one embodiment of a thermal treatment system that includes a waveguide with arms of unequal length in accordance with some embodiments of the presently disclosed subject matter.
Figure 3B:
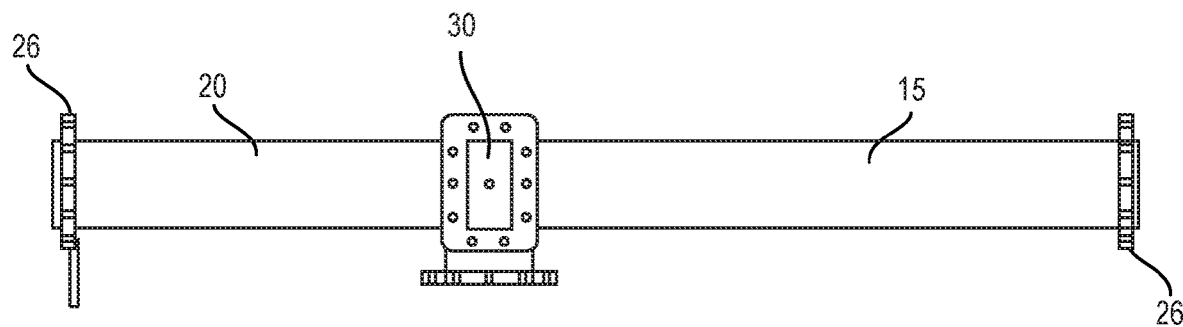
Figure 3C:
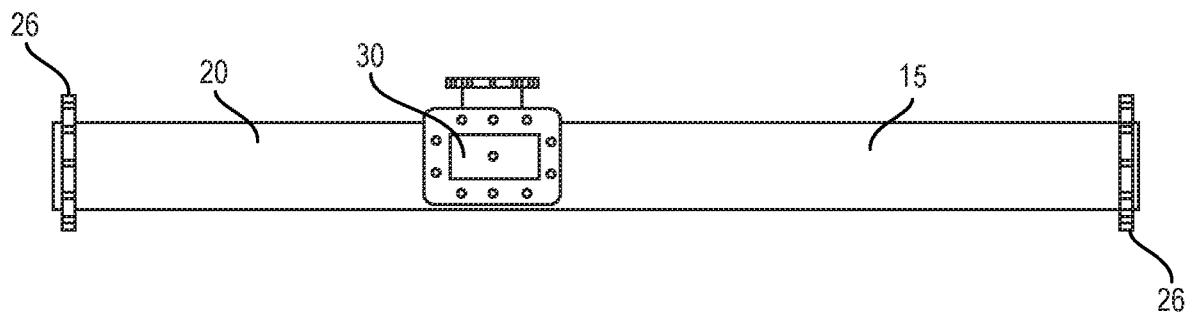

First and second arms 15, 20 of waveguide 10 extend in opposite directions along a main axis from central applicator junction 30 to termination ends 40, 45. In some embodiments, the first and second arms are of the same length or about the same length. However, the presently disclosed subject matter also includes embodiments wherein the first and second arms are of unequal lengths as shown, for example, in FIGS. 3a-3c, to thereby control energy distribution and provide improved control and stability maintenance. As a result, independent control of the spatial density of the energy delivery between the two arms during the passage of the processed material can be achieved. Advantageously, this can permit a user to adjust and optimize the heat treatment for different materials by designing a system with arms of different lengths. In some embodiments, the ratio of the lengths of the first and second arms can be 5:95, 10:90, 15:85, 20:80, 25:75, 30:70, 35:65, 40:60, 45:55, 55:45, 60:40, 65:35, 70:30, 75:25, 80:20, 85:15, 90:10, 95:5 and any values in between.

In some embodiments, waveguide 10 has a rectangular cross section. However, the presently disclosed subject matter is not limited and the disclosed waveguide can have any desired cross-sectional shape, such as circular, oval, square, triangular, and the like.

In some embodiment of the presently disclosed subject matter, the waveguide delivers electromagnetic energy to the first and second arms at adjustable energy distribution rates. In addition, advantageously selecting and implementing unequal lengths for the two arms, and terminating each with a reflector plate enables independent control of the spatial density of the energy delivery between the two arms during the passage of the flowable material/product. Accordingly, in addition to the energy distribution split at the base of the system, the unequal lengths for the two arms can provide a second means for controlling energy distribution for improved process control and stability maintenance.

As illustrated in FIG. 1, waveguide 10 includes multi-port applicator junction 30 configured to deliver electromagnetic energy from a generator to first and second arms 15, 20. Particularly, generator 50 can include any device capable of producing electromagnetic energy, such as microwave energy. For example, any commercial or industrial generator capable of producing high frequency microwaves (e.g., a magnetron) can be used to produce the electromagnetic energy. In some embodiments, a plurality of generators can be added in parallel or in series to increase energy production and/or temperature generated. The frequencies generated for the microwave heating process can include the entire frequency range classified as microwaves, such as about 915, 2450, 5800, and/or 24125 MHz. For example, the generator can include a 915 MHz microwave generator that generates at least 20 kW of microwave energy. However, the disclosed generator is not limited to these frequencies and power level, and alternate frequencies and/or power levels can be produced based on the requirements of the application, product and/or process.

Multi-port applicator junction 30 can include any desired number of ports. For example, in some embodiments, the applicator junction can include 1-8 ports, such as, for example, 1, 2, 3, 4, 5, 6, 7, or 8 ports. However, the presently disclosed subject matter is not limited and can include an applicator junction with more than 8 ports.

Figure 4:
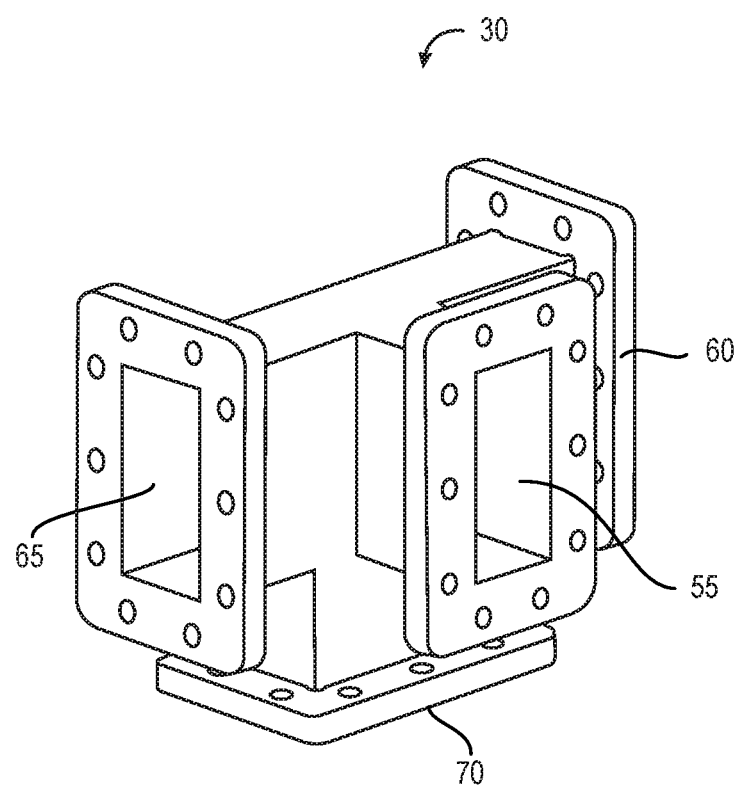
FIG. 4 is a perspective view of a four-port applicator junction in accordance with some embodiments of the presently disclosed subject matter.

FIG. 4 illustrates one embodiment of applicator junction 30 configured as a 4-port junction comprising input port 55 through which electromagnetic energy enters the waveguide. The input port facilitates coupling the electromagnetic energy to the waveguide. The applicator junction further includes first and second output ports 60, 65 through which the electromagnetic energy enters the first and second arms 15, 20, respectively. As shown in FIG. 4, the applicator junction includes end port 70; in some embodiments, end port 70 can be a dummy port that is sealed. The applicator junction advantageously splits the power entering input port 55 into each of the two collinear waveguide arms through the first and second output ports 60, 65. In some embodiments, the input port is perpendicular to waveguide arms 15, 20.

As shown if FIG. 4, the applicator junction comprises superimposed H-plane (shunt) and E-plane (series) tees. When matched loads are connected to both output ports, electromagnetic energy entering input port 55 is divided equally between the output ports and isolated from end port 70. The phase relationships between the two output ports possess certain characteristics depending on whether individual H-plane and E-plane tees are used. For example, waves at the output port surfaces can have the same phase relationship for divided power from H-plane input port. Alternately, the outputs can be out of phase (e.g., 180 degrees) for divided power from the E-plane input port. Further, the energy outputs can be completely isolated due to the phase shift that sends any reflected energy back to the input source rather than to the output. In some embodiments, the phase shift can be about 180 degrees, although larger or smaller phase shifts are within the scope of the presently disclosed subject matter. Advantageously, the disclosed applicator junction allows the user to interchangeably enter the E-plane or the H-plane with energy. It should be appreciated that although a 4-port applicator junction is described herein, the disclosed system is not limited and any desired applicator junction can be used.

In some embodiments, applicator junction 30 can be used to supply the electromagnetic energy to the waveguide at adjustable distribution rates. For example, the radiation can be divided equally (50%-50%) between the first and second waveguide arms. However, it should be appreciated that the distribution can be in any desired combination, such as about 1-99% to waveguide first arm 15 and about 99-1% to second arm 20, with all the intermediate distribution stages included in the range of possible and controllable energy delivery distribution strategies.

As shown in FIG. 1, system 5 further comprises conduit 35 for treating a flowable material/product with electromagnetic energy. Particularly, conduit 35 is used to transport flowable product 36 through the disclosed system. The conduit enters the waveguide at inlet port 41 at first termination end 40 and travels along waveguide first arm 15 to waveguide second arm 20 and exits at exit port 42 of second termination end 45. At least a portion of conduit 35 that passes through waveguide 10 is constructed from a material that is fully or partially transparent to electromagnetic energy. Thus, the conduit can be constructed from any material that is about 50-100 percent transparent to electromagnetic energy, such as about 50, 55, 60, 65, 70, 75, 80, 85, 90, 95, or 100 percent transparent. The phrase "transparent to electromagnetic energy" refers to a characteristic of a material whereby electromagnetic energy (for example, microwaves) substantially passes through the material.

In some embodiments, conduit 35 can be constructed from ceramic material (e.g., alumina), glass (e.g., borosilicate glass), polymeric material (e.g., Teflon®, polypropylene, polymethylpentene, polysulfone, polyetheretherketone (PEEK), and polyetherimide), or combinations thereof. Because conduit 35 is constructed from a material that is transparent to the frequency of electromagnetic energy used, it does not heat significantly when exposed to microwave energy. Rather, the electromagnetic energy, or a major portion thereof, passes through the conduit and is absorbed by product 36 within the conduit. The application of electromagnetic energy produces heat within the products being treated, causing microbial destruction with minimized loss of product functionality. The microbial inactivation can be due to thermal effects and/or can include thermal effects resulting from unknown interactions between biochemical constituents of microbes and the electromagnetic field. Accordingly, in various embodiments of the subject matter disclosed herein, electromagnetic energy is converted to heat as it interacts with product 36. Specifically, absorption of the electromagnetic energy increases the kinetic energy of the molecules of the product, thereby increasing the temperature.

In some embodiments, conduit 35 can have a circular cross section. However, the shape of the conduit is not limited and can have an oval, square, rectangular, etc. cross-sectional shape. In some embodiments, conduit 35 is mostly transparent to microwave energy. In some embodiments, conduit 35 may be constructed of FEP, PTFE, PEEK, Ultem, ceramic, glass, and the like. In one embodiment, conduit 35 may be constructed of food safe material as stipulated by the FDA for regulated applications. In some embodiments, conduit 35 can be safely exposed to temperatures in excess of 100° C., 150° C., 200° C. and the like. In some embodiments, the conduit can withstand of pressures in excess of 10 PSI, 100 PSI, 200 PSI, 2500 PSI, and the like. Further, the conduit may be straight or bent at a predetermined angle, as dictated by the application.

Product 36 can be pumped through conduit 35 using any known mechanism sufficient to provide continuous flow at a relatively constant rate throughout the system. For example, in some embodiments, the use of positive displacement pumps, pressurized systems with metered flow control, gravity flow conduits, sinusoidal pumps, auger-type pumps, or combinations thereof can be used. In some embodiments, product 36 travels through system at a flow rate of about 0.25 gallons per minute or more (e.g., 0.25, 0.5, 0.75, 1, 5, 10, 15, 20, 25, 30, 35, 40, 45, 50, 55, 60, 65, 70, 75, 80, 85, 90, 95, or 100 gallons per minute.) However, the rate can be greater or less than the range set forth above. In various embodiments, the flow rate of product through waveguide 10 is substantially consistent.

Product 36 can include any material that is flowable or capable of moving through conduit 35 in a controllable, consistent manner. Flowable materials suitable for use with system 5 can include biomaterials (e.g., foods, plants), pharmaceutical materials (e.g., medicines, cosmetics), and the like. Suitable flowable foods and biomaterials can include (but are not limited to) liquids, purees, juices, homogenates, emulsions comprising multiple liquid components, simple suspensions comprising small or large solid particles of single type, complex suspensions containing multiple particle types in a carrier, biomaterials suitable for exposure to microwave energy to achieve a modification or improvement of state or properties (e.g., heating, pasteurization, sterilization, emulsification, melting, coagulation, denaturation, precipitation, gel formation or breakdown, separation or improvement of internal distribution of components or ingredients, and the like).

In some embodiments, the disclosed system can be used for microwave assisted extraction of bioactive materials from biomass. The term "biomass" typically refers broadly to any plant-based material (e.g., fruits, vegetables, seeds, roots, flowers, saps, barks, leaves, stems, etc.). Additionally, biomass can also be from animal, fungal, mushroom, bacterial, yeast, shellfish and algal material and microwave assisted extraction can also be implemented to products and by-products resulting from processing of such materials such as milk, whey, eggs, egg shells, shellfish and shellfish shells, bones, cartilage, feathers, etc.

Suitable bioactive materials can include (but are not limited to) lipids, carotenoids, polyphenols, vitamins, flavonoids, isoflavones, curcuminoids, ceramides, proanthocyanidins, terpenoids, sterols, phytosterols, sterol esters, tocotrienols, squalenes, and/or retinoids. It should be appreciated that there can be additional components extracted in addition to the bioactives, such as flavor compounds. The term "microwave assisted extraction" as used herein primarily refers to the process of heating a biomass slurry (biomass and solvent) using microwave energy to partition compounds of interest (i.e., bioactive agents) from the biomass into the solvent. "Continuous microwave assisted extraction" refers to a microwave assisted extraction method where solvent and biomass are pumped continuously though the microwave system to extract bioactive agent(s). Additionally, microwave assisted extraction can also be utilized directly, without the solvents, to enable separation of lipids and/or essential oils from plant and other materials, for example, in the production of pressed nut seed oil and other types of oils, as well as separation and subsequent recovery of volatile aromatic materials, to be used in flavorings and scent bases such as aromas and volatiles from herbs, spices and fragrant fruit and vegetable materials.

Product 36 can be homogeneous or heterogeneous. The term "homogeneous" refers to a uniform blend of the components that make up product 36, such as tomato puree. The term "heterogeneous" refers to a non-uniform blend of the components, such as chicken noodle soup. Further, product 36 can be liquid or semi-liquid. The term "semi-liquid" refers to a product having properties between a solid and a liquid. In some embodiments, product 36 can be in a completely natural, raw, or non-processed state. Alternatively, in some embodiments, the product can be processed and/or pre-treated to any degree.

Product 36 can include any and all combinations of liquid, solid and gaseous phases comprising a flowable combination of foods and/or biomaterials suitable for exposure to microwave energy to achieve a modification or improvement of state or properties.

In some embodiments, the disclosed apparatus can optionally include one or more sensors for monitoring temperature, pressure and/or other parameters at various positions/locations, such as, for example, within conduit 35 and within waveguide 10, of system 5. Any known sensors can be used. For example, in some embodiments, the sensors can be configured as multi-point thermocouple probes that provide coverage of an area perpendicular to the direction of material flow within conduit 35 and/or at or near a location where product 36 exits the waveguide. In some embodiments, the sensing location is located closer to the electromagnetic energy delivery location to provide for better control of the end point temperatures of the flowing product 36.

In some embodiments, the disclosed system can comprise a control device that allows the user to monitor and adjust various system characteristics. For example, the control device can control flow of product 36 through conduit 35, for example, by controlling the flow rate. In some embodiments, the control device can control a power level of generator 50, for example, by increasing or decreasing the electromagnetic energy applied for a particular product. In some embodiments, the generator power level can be automatically pre-set or manually adjusted to a predetermined level to provide a desired thermal treatment of the flowable product. In some embodiments, the control device can monitor and/or adjust backpressure of the product as it flows through the waveguide, for example, to ensure that the pressure stays above the flashpoint of the flowable product in the conduit. In some embodiments, the backpressure control device can be positioned at the exit of the waveguide.

Figure 5:
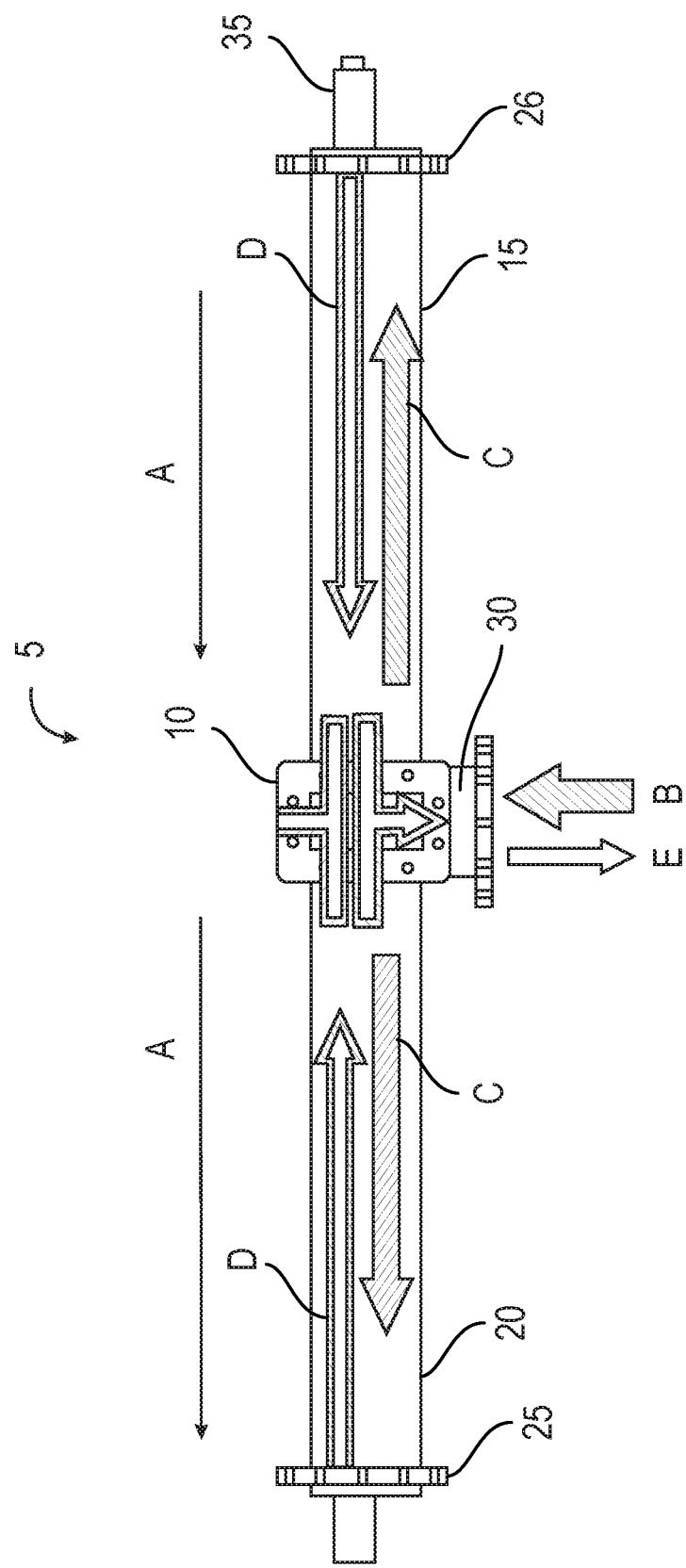
FIG. 5 is a front plan view of a thermal treatment system in accordance with some embodiments of the presently disclosed subject matter during use.

In use, the product to be thermally treated is pumped using conventional methods through conduit 35 to pass through and along a length of waveguide 10, as shown by Arrows A of FIG. 5. Particularly, the product is introduced into first arm 15 of the waveguide via material entry port 41 and is conveyed through the conduit under continuous and/or consistent flow conditions. The product travels along the waveguide from first arm 15 to second arm 20 where it undergoes exposure to electromagnetic energy delivered by the generator through applicator junction 30.

As shown, electromagnetic energy (e.g., microwave energy) is delivered to input port 55 (shown by Arrow B in FIG. 5) of the application junction. The input port delivers the electromagnetic energy to first and second arms 15, 20 in both the co-current and counter-current directions relative to the flow of product (shown by Arrows C and D in FIG. 5). As shown, the microwave energy initiates from one direction (input port 55) and is split into two directions to travel down the first and second arms via first and second output ports 60, 65. Reflective plates 25 positioned at the end of each waveguide allow microwave energy that has not been absorbed by product 36 to flow back in the opposing direction, shown by Arrows D. Advantageously, the output for each end of the waveguide is isolated from the output of the other end of the waveguide due to a phase shift, for example, of 180 degrees. As a result, any reflected energy exits through the input source rather than flowing to the opposing waveguide, shown by Arrow E. Further, the electromagnetic energy is single mode, resulting in no or minimal scatter. The term "single mode" as used herein refers to a traveling wave moving in the direction of propagation. As a result, the electromagnetic energy is more focused and controllable compared to prior art systems.

Figure 6:
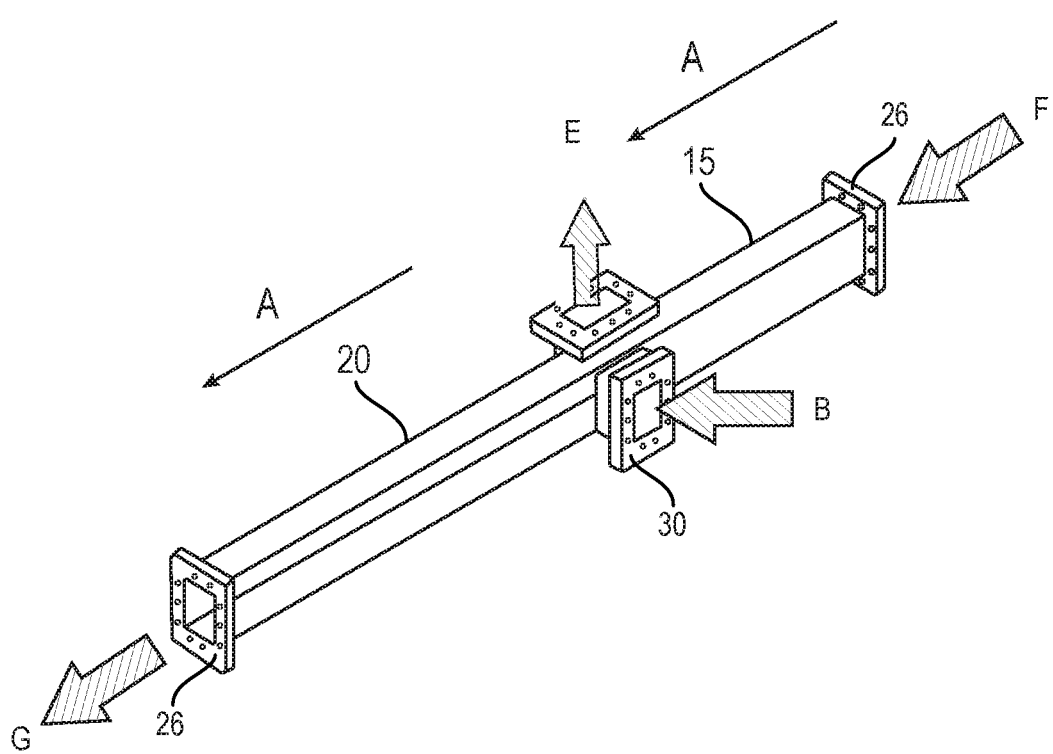
FIG. 6 is a perspective of a thermal treatment system in accordance with some embodiments of the presently disclosed subject matter during use.

FIG. 6 shows another embodiment of the thermal treatment system. The primary difference of the FIG. 6 embodiment over the FIG. 5 embodiment is that in the FIG. 6 embodiment the reflected energy exits from a port different from the input port (in the FIG. 5 embodiment, the reflected energy exits through the same port through which energy is originally input). To elaborate, in use, the product to be thermally treated is pumped using conventional methods through conduit 35 to pass through and along a length of waveguide 10, as shown by Arrows F and G of FIG. 6. In other words, product 36 generally enters the system in the direction shown by Arrow F, and exits the system in the direction shown by Arrow G (conduit 35 is not illustrated in FIG. 6). Particularly, the product is introduced into first arm 15 of the waveguide via material entry port 41 and is conveyed through the conduit under continuous and/or consistent flow conditions. The product travels along the waveguide from first arm 15 to second arm 20 where it undergoes exposure to electromagnetic energy delivered by the generator through applicator junction 30. As shown in FIG. 6, electromagnetic energy (e.g., microwave energy) is delivered to input port 55 (shown by Arrow B in FIG. 6) of the application junction. The input port delivers the electromagnetic energy to first and second arms 15, 20 in both the co-current and counter-current directions relative to the flow of product. The microwave energy initiates from one direction (input port 55) and is split into two directions to travel down the first and second arms via first and second output ports 60, 65. Reflective plates 25 positioned at the end of each waveguide allow microwave energy that has not been absorbed by product 36 to flow back in the opposing direction. Any reflected energy exits through the port as shown by Arrow E in FIG. 6, this port being different from the input port 55 through which the electromagnetic energy is delivered to the system.

As set forth above, conduit 35 is constructed from a material that is at least partially transparent to electromagnetic energy, so that as product 36 passes through the waveguide, it is exposed to the electromagnetic energy. As a result, at least a portion of the electromagnetic energy that enters the first arm of waveguide 10 is absorbed by product 36 and is converted to heat. The product is further heated during conveyance through the second arm of waveguide 10. The temperature level and range within the waveguide is sufficiently high to achieve a predetermined level of thermal treatment after passing through arms 15, 20. For example, in some embodiments, the level of thermal treatment can be enough to preserve the product, such as through pasteurization and/or sterilization.

Thus, electromagnetic energy absorption and subsequent conversion to heat result in an increase in temperature of product 36 within conduit 35. In some embodiments, the temperature can range from about 70° C. to about 105° C. for high acid foods and biomaterials (e.g., fruit, pickled vegetables, tomatoes, and salsa). In some embodiments, the temperature can range from about 110° C. to 145° C. for low acid foods and biomaterials (e.g., soups, stews, cheese sauces). Thus, the temperature of product 36 within conduit 35 can range from at least about (or no more than about) 70, 75, 80, 85, 90, 95, 100, 105, 110, 115, 120, 125, 130, 135, or 140° C. However, it should be appreciated that temperatures above and below the range set forth above is included within the scope of the presently disclosed subject matter.

The disclosed system may advantageously not require a mixing device to mix product 36 within the conduit as it travels through the waveguide. Rather, the disclosed system employs single mode microwave energy, resulting in a product with a more uniform temperature.

In some embodiments, after exiting second arm 20, product 36 can be passed through a conduit segment (a "hold tube") sufficiently long to enable maintenance of the product at or above the predetermined temperature level for a predetermined amount of time under continuous flow conditions. The combination of time and temperature treatment may be required for some products to thermally inactivate microorganisms that could potentially endanger health of consumers and/or cause spoilage of the product under typical conditions of storage and distribution.

Optionally, product 36 can be cooled following thermal treatment in system 5 using conventional cooling systems, such as (but not limited to) tube-in-tube heat exchangers, tube-in-shell heat exchangers, helical heat exchangers, plate heat exchangers, swept surface heat exchangers, liquid nitrogen injection, $CO_2$ gas injection or injection of other inert gases, and/or immersion in water bath, ice bath, or other convenient coolant material.

In some embodiments, the thermal treatment provided by system 5 is sufficient to produce a product having a shelf life of about 4 weeks to 24 months under ambient or under refrigerated conditions (4° C. or below). Thus, in various embodiments, the treated product can have a shelf life under ambient or refrigerated conditions of at least about 4, 6, 8, 12, 26, 52, or 104 weeks or more.

Advantageously, since heat is generated within the product being heated, the disclosed system ensures that product does not have to contact heated surfaces acting as a thermal transfer surfaces. Accordingly, fouling or burning of biomaterials in contact with heated surfaces can be reduced or eliminated when using the disclosed system. As a result, extended process run-times can be achieved and yields with greater efficiency can be produced. The disclosed system can accordingly enable the production of thermally-treated products with favorable functional characteristics that lack burned-on and/or flaked off material.

Embodiments of the presently disclosed subject matter can accordingly provide a simple, less expensive and efficient way for delivering microwave energy to a continuously flowing material, compared to prior art methods. The disclosed system also enables a more efficient control and minimization of issues, such as localized overheating, flashing, arcing and the like.

Embodiments of the presently disclosed subject matter may advantageously enable concurrent and controllable energy distribution and application to continuously flowing pumpable foods or biomaterials. The embodiments can provide economic, operational, control and safety benefits compared to what is otherwise known in the art. The embodiments can enable savings in construction material, footprint occupied and energy utilization expenditures. The embodiments can advantageously reduce risk of process deviations which have been known to cause flashing, arcing, flow-through conduit damage, breach and catastrophic failures during processing, especially if the processed material is not precisely matched to the limited processing capabilities of previous designs.

In some embodiments, the product may have predominately horizontal flow to ameliorate issues of density range differences due to the self-limiting velocity characteristics of both very high and very low density particulate materials due to moving along the bottom of the conduit or along the top of the conduit resulting in reduced velocity due to friction against the walls of the conduit. However, the presently disclosed subject matter is not limited to horizontal flow and the disclosed system can be configured in vertical or angled flow regimes.

Embodiments of the presently disclosed subject matter may enable processing of a much broader range of products with much more varying dielectric and thermo-physical characteristics, both simple/single phase materials as well as complex multi-phase materials comprising of ingredients with widely varying characteristics, for example, complex soups and stews like minestrone soup, beef stew, brunswick stew, and the like.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a conduit" can include a plurality of such conduits, and so forth. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. An apparatus for thermally treating a flowable material, the apparatus comprising:
   a waveguide defined by first and second arms that extend in opposing directions, wherein each arm comprises a termination end that includes a reflector plate and a port for allowing a conduit to pass therethrough;

a conduit for receiving a flowable material, wherein the conduit passes through the first and second arms and wherein at least a portion of the conduit is transparent to electromagnetic energy;

a multi-port applicator junction that delivers electromagnetic energy to the first and second arms of the waveguide; and a generator for providing electromagnetic energy to the multi-port applicator junction through an input port;

wherein each waveguide arm includes an output that is isolated from the output of the other arm and optionally includes a phase shift, such that any reflected electromagnetic energy exits the arm through the input port.

2. The apparatus of claim 1, wherein the first and second arms of the waveguide are about the same length.

3. The apparatus of claim 1, wherein the first and second arms of the waveguide are of unequal lengths.

4. The apparatus of claim 1, wherein the phase shift is approximately 180 degrees.

5. The apparatus of claim 1, wherein the electromagnetic energy is microwave energy.

6. The apparatus of claim 1, wherein the multi-port applicator junction comprises the input port that receives electromagnetic energy, a first output port that delivers electromagnetic energy to the first arm, a second output port that delivers electromagnetic energy to the second arm, and an end port.

7. The apparatus of claim 1, wherein the input port is perpendicular to the first and second arms.

8. The apparatus of claim 1, wherein the multi-port applicator junction is configured to deliver electromagnetic energy entering the input port equally between the first and second arms.

9. The apparatus of claim 1, wherein the portion of the conduit that is transparent to electromagnetic energy is constructed from one or more ceramic materials, glass, or polymeric materials.

10. The apparatus of claim 1, wherein the portion of the conduit that is transparent to electromagnetic energy is approximately 50-100 percent transparent.

11. The apparatus of claim 1, wherein a portion of the conduit passing through the first arm has a first microwave transparency, and a portion of the conduit passing through the second arm has a second microwave transparency that is different from the first microwave transparency.

12. The apparatus of claim 1, further comprising a control device for maintaining a constant flow rate of product through the conduit.

13. The apparatus of claim 1, wherein the flowable material is a biomaterial.

14. The apparatus of claim 13, wherein the biomaterial is a food product.

15. The apparatus of claim 1, wherein the flowable material is not subjected to a heated surface.

16. The apparatus of claim 1, configured to control and deliver unequal electromagnetic energy density to the first and second arms of the waveguide.

17. The apparatus of claim 16, wherein delivery of the unequal electromagnetic energy density occurs in real time.

18. An apparatus for thermally treating a flowable material, the apparatus comprising:

a waveguide defined by first and second arms that extend in opposing directions, wherein each arm comprises a termination end that includes a reflector plate and a port for allowing a conduit to pass therethrough;

a conduit for receiving a flowable material, wherein the conduit passes through the first and second arms and wherein at least a portion of the conduit is transparent to electromagnetic energy;

a multi-port applicator junction that delivers electromagnetic energy to the first and second arms of the waveguide; and a generator for providing electromagnetic energy to the multi-port applicator junction through an input port;

wherein each waveguide arm includes an output that is isolated from the output of the other arm and optionally includes a phase shift, such that any reflected electromagnetic energy exits the arm through an exit port different from the input port.

19. The apparatus of claim 18, wherein the multi-port applicator junction comprises the input port that receives electromagnetic energy, a first output port that delivers electromagnetic energy to the first arm, a second output port that delivers electromagnetic energy to the second arm, and the exit port.

20. A method of thermally treating a flowable material, the method comprising:

passing the flowable material as a continuous stream through a thermal treatment apparatus comprising:

a waveguide defined by first and second arms that extend in opposing directions, wherein each of the first and second arms comprises a termination end that includes a reflector plate and a port for allowing a conduit to pass therethrough;

a conduit for receiving a flowable material that passes through the first and second arms, wherein at least a portion of the conduit is transparent to electromagnetic energy;

a multi-port applicator junction that delivers electromagnetic energy to the first and second arms of the waveguide; and a generator for providing electromagnetic energy to the multi-port applicator junction through an input port;

wherein each waveguide arm includes an output that is isolated from the output of the other waveguide arm by a phase shift, such that any reflected electromagnetic energy exits the waveguide arm through an exit port different from the input port;

initiating the generator to provide electromagnetic energy to the input port of the multi-port applicator junction, wherein the electromagnetic energy travels to the first and second arms of the waveguide, and wherein the portion of the conduit that is transparent to electromagnetic energy is thereby exposed to electromagnetic energy such that the flowable material is thermally treated.

21. The apparatus of claim 1, wherein the flowable material is a liquid.

22. The apparatus of claim 1, wherein the electromagnetic energy is single mode.

23. The apparatus of claim 22, wherein the single mode electromagnetic energy is a traveling wave moving in the direction of propagation that results in no or minimal scatter.

24. The apparatus of claim 1, wherein the input port has an offset angle of greater than one degree with respect to the first and second arms.

* * * * *